(12) United States Patent
Takahashi

(10) Patent No.: US 7,619,847 B2
(45) Date of Patent: Nov. 17, 2009

(54) HEAD CONTROLLER, STORAGE DEVICE, AND HEAD CONTROLLING METHOD

(75) Inventor: Tetsuya Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 33 days.

(21) Appl. No.: 11/895,513

(22) Filed: Aug. 23, 2007

(65) Prior Publication Data

US 2008/0100951 A1    May 1, 2008

(30) Foreign Application Priority Data

Oct. 31, 2006   (JP)  ................ 2006-296376

(51) Int. Cl.
*G11B 21/02* (2006.01)

(52) U.S. Cl. .......................... 360/75; 360/60

(58) Field of Classification Search .................. None
See application file for complete search history.

(56) References Cited

U.S. PATENT DOCUMENTS

| | | | |
|---|---|---|---|
| 7,324,299 B1 * | 1/2008 | Schreck et al. ................. 360/75 |
| 2003/0174430 A1 | 9/2003 | Takahashi et al. |
| 2004/0114268 A1 | 6/2004 | Satoh et al. |
| 2005/0052773 A1 | 3/2005 | Suk |
| 2006/0092570 A1 | 5/2006 | Payne et al. |
| 2006/0139789 A1 | 6/2006 | Yang |
| 2007/0230015 A1 * | 10/2007 | Yamashita et al. ............ 360/75 |
| 2007/0236821 A1 * | 10/2007 | Ma et al. ....................... 360/75 |
| 2007/0268608 A1 * | 11/2007 | Takahashi ..................... 360/75 |
| 2007/0268612 A1 * | 11/2007 | Fitzpatrick et al. ............ 360/75 |
| 2007/0268614 A1 * | 11/2007 | Henry et al. .................. 360/75 |

FOREIGN PATENT DOCUMENTS

| EP | 1 677 290 A2 | 7/2006 |
|---|---|---|
| EP | 1 677 290 A3 | 7/2006 |
| JP | 2003-272335 A | 9/2003 |

OTHER PUBLICATIONS

Kurita et al; "Active flying-height control slider using MEMS thermal actuator"; Microsystem Technologies, vol. 12, No. 4; pp. 369-375; Mar. 2006.

* cited by examiner

*Primary Examiner*—Jason C Olson
(74) *Attorney, Agent, or Firm*—Greer, Burns & Crain, Ltd.

(57) ABSTRACT

A level peak-acquiring unit acquires a peak of a signal level during a calibration wherein a heater power is increased from zero to a predetermined power. A sample acquiring unit acquires in a sampling range, a sample of a combination of the heater power and the signal level. A linear function-determining unit determines a linear function that approximates from the sample, a relation between the heater power and the signal level. Based on the peak of the signal level and the linear function, a control Touch Down Point (TDP)-calculating unit calculates the heater power corresponding to the peak of the signal level and treats the calculated heater power as a control touchdown point. Then, the control TDP-calculating unit uses the control touchdown point to convert into a linear function of the heater power and spacing, the linear function of the heater power and the signal level.

12 Claims, 7 Drawing Sheets

HEAD CONTROLLER, STORAGE DEVICE, AND HEAD CONTROLLING METHOD

BACKGROUND OF THE INVENTION

1. Field of the Invention

The present invention relates to a head controller, a storage device, and a head controlling method that control using thermal expansion due to a heater, a position of a tip of a head that faces a storage medium and that at least reads signals of the storage medium, and, more particularly to a head controller, a storage device, and a head controlling method that can accurately control a spacing between the head and a disk medium.

2. Description of the Related Art

In a commonly used storage device such as a magnetic disk device and a magneto-optical disk device that stores data in a disk medium, a head that is noncontactably provided with respect to the disk medium reads data from the disk medium and writes data to the disk medium. When reading data from the disk medium, because the head detects signals from a magnet or signals due to reflection of a laser beam, sensitivity to the signals is increasingly enhanced due to the head and the storage medium approaching each other, thus increasing precision of data. Recently, along with an increase in a surface density of the disk medium, levitation that indicates a distance between the head and the disk medium is extremely reduced, for example, to less than or equal to 10 nanometers (nm).

However, along with a reduction in the levitation, a tip of the head touching the disk medium is likely to scratch the head or the surface of the disk medium and interfere with rotations of the disk medium. Thus, accurately positioning the tip of the head and fixedly maintaining a distance (hereinafter, "spacing") between the tip of the head and a disk medium surface is becoming increasingly significant.

For example, in a technology disclosed in Japanese Patent Application Laid-open No. 2003-272335, a heating coil and a thermal expansion body are included inside the head and thermal expansion of the thermal expansion body is controlled by power supply to the heating coil, thus causing a surface of the head facing the disk medium to protrude in a direction of the disk medium to regulate the spacing. When using a technology such as the technology disclosed in Japanese Patent Application Laid-open No. 2003-272335 to control the spacing by regulating power of a heater such as the heating coil, a prior calibration needs to be carried out for acquiring a correspondence between the heater power and the spacing. In other words, by gradually increasing the heater power, a heater power (hereinafter "touchdown point") needs to be calculated when the tip of the head and the disk medium surface touch each other (touchdown) and the spacing becomes zero.

When calculating a touchdown point, an increase in a signal level along with the increase in the heater power is monitored and the heater power is acquired at the time when the signal level converges at an upper limit. In other words, due to thermal expansion as a result of the increase in the heater power, the tip of the head approaches near the disk medium surface, thus enhancing the sensitivity to the signals and increasing the signal level. However, the sensitivity is not enhanced after occurrence of the touchdown and the signal level reaches a saturation point. Thus, the heater power at the time when the signal level converges at the saturation point can be detected as the touchdown point.

However, the surface of the disk medium, which is touched by the tip of the head, is not completely smooth and includes minute asperities of a nanometer order. Due to this, the signal level does not converge clearly and detecting the touchdown point becomes difficult. To be specific, as shown in FIG. 5A, if the surface of the disk medium is smooth and ideal, upon increasing the heater power, the signal level increases while maintaining a linearity to a certain extent and upon reaching the upper limit, ceases to increase beyond the upper limit. Thus, during conditions such as the condition shown in FIG. 5A, the touchdown point (indicated by "TDP" in the drawings) can be easily detected.

If the surface of the disk medium includes asperities, as shown in FIG. 5B, the heater power and the signal level maintain the linearity in a range in which the heater power is less and is not affected by the asperities. However, upon the heater power increasing and the tip of the head approaching the disk medium surface, an increase rate of the signal level is desensitized and the signal level reaches the saturation point without a clear point of variation. Due to this, detecting the touchdown point from a change in the signal level becomes difficult and accurate calibration cannot be carried out. If the calibration is not carried out, the spacing cannot be controlled accurately, thus resulting in occurrence of wearing of the disk medium surface and errors while reading data from the disk medium and writing data to the disk medium.

SUMMARY OF THE INVENTION

It is an object of the present invention to at least partially solve the problems in the conventional technology.

According to an aspect of the present invention, a head controller that controls using thermal expansion due to a heater, a position of a tip of a head that faces a storage medium and that at least reads signals from the storage medium, the head controller includes an acquiring unit that acquires a sample of a combination of a heater power of the heater and a signal level of signals that are read from the storage medium; a determining unit that determines an approximation function that approximates a relation of the sample acquired by the acquiring unit; and a converter that converts the approximation function determined by the determining unit into a function of the heater power of the heater and a distance between the tip of the head and the surface of the storage medium.

According to another aspect of the present invention, a storage device that stores data in a storage medium, the storage device includes a read/write unit that faces the storage medium and that reads signals from the storage medium and writes signals to the storage medium; a heater that controls a position of the read/write unit by using thermal expansion due to the heater; an acquiring unit that acquires a sample of power of the heater and a signal level of the signals that are read from the storage medium by the read/write unit; a determining unit that determines an approximation function that approximates a relation of the sample acquired by the acquiring unit; and a converter that converts the approximation function determined by the determining unit into a function of the power of the heater and a distance between the read/write unit and the surface of the storage medium.

According to still another aspect of the present invention, a head controlling method that controls using thermal expansion due to a heater, a position of a tip of a head that faces a storage medium and that at least reads signals from the storage medium, the head controlling method includes acquiring a sample of a combination of a heater power of the heater and a signal level of signals that are read from the storage medium; determining an approximation function that approximates a relation of the sample acquired by the acquiring; converting the approximation function determined by the determining into a function of the heater power of the heater and a distance between the tip of the head and the surface of the storage medium; and calculating a control value of the heater power corresponding to the desired distance between the tip of the head and the surface of the storage medium by using the function obtained due to conversion by the converting.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. An example of a magnetic disk device as a storage device is used to explain the embodiments. However, the present invention can also be applied to a storage device such as a magneto optical disk device or an optical disk device that includes an optical head or a magnetic head for generating bias magnetic field or to a head tester that measures and analyzes characteristics of a head by fixing a position of the head.

Figure 1:
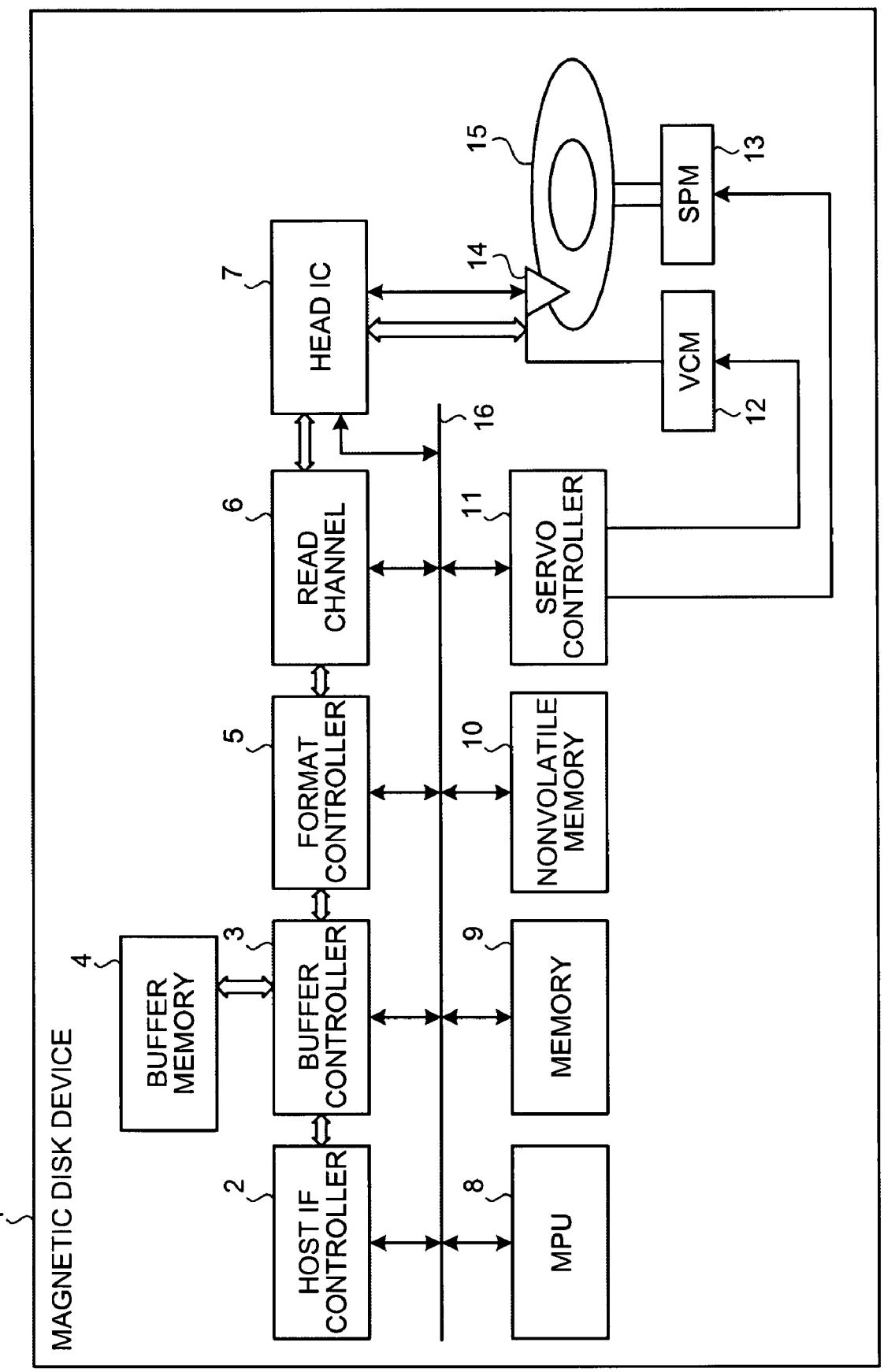
FIG. 1 is a block diagram of a magnetic disk device according to an embodiment of the present invention.

FIG. 1 is a block diagram of a magnetic disk device 1 according to a first embodiment of the present invention. As shown in FIG. 1, the magnetic disk device 1 includes a host interface controller (hereinafter, "Host IF controller") 2, a buffer controller 3, a buffer memory 4, a format controller 5, a read channel 6, a head Integrated Circuit (IC) 7, a Micro Processing Unit (MPU) 8, a memory 9, a nonvolatile memory 10, a servo controller 11, a Voice Coil Motor (hereinafter, "VCM") 12, a spindle motor (hereinafter, "SPM") 13, a head 14, a magnetic disk 15, and a shared bus 16.

The host IF controller 2 is connected to a host that is an upper level device of the magnetic disk device 1. The host IF controller 2 controls a communication between the host and the magnetic disk device 1. The buffer controller 3 controls the buffer memory 4. The buffer memory 4 temporarily stores therein data that is exchanged between the host and the magnetic disk device 1.

The format controller 5 controls reading of data. For example, the format controller 5 checks errors in the read data. When reading data, the read channel 6 amplifies data signals that are output from the head IC 7 and executes predetermined processes such as an Analog to Digital (AD) conversion process and a demodulation process. The head IC 7 includes a not shown preamplifier. When reading the data, the head IC 7 prior amplifies the data signals that are read by the head 14.

The MPU 8 carries out main control of the magnetic disk device 1 using predetermined control programs (firmware programs). In other words, the MPU 8 deciphers commands from the host and controls various processors. The MPU 8 carries out integrated control of reading of data from the magnetic disk 15 and writing of data to the magnetic disk 15. In an embodiment of the present invention, the MPU 8 carries out a calibration for determining a position of a tip of the head 14 and controls a heater inbuilt into the head 14 to regulate a distance (hereinafter, "spacing") between the tip of the head 14 and a surface of the magnetic disk 15. Using the MPU 8 to regulate the spacing is explained later.

The memory 9 and the nonvolatile memory 10 store therein the firmware programs that operate in the MPU 8 and various control data. The servo controller 11 drives motors of the VCM 12 and the SPM 13 while confirming an operation status of the VCM 12 and the SPM 13. The VCM 12 controls a position of the head 14. The SPM 13 rotates the magnetic disk 15 to control a read position of data that is read by the head 14.

The head 14 includes a not shown recording element and a reproducing element at the tip that approaches the magnetic disk 15. The head 14 writes data signals to the magnetic disk 15 and reads data signals that are recorded in the magnetic disk 15. The head 14 also includes the not shown heater for regulating the distance (spacing) between the tip and the magnetic disk 15. Thermal expansion of the tip due to the heater reduces the spacing. The magnetic disk 15 is a disk medium (storage medium) that includes a magnetic material. The magnetic disk 15 magnetically records data by changing magnetization state of the magnetic material. The shared bus 16 connects various processors inside the magnetic disk device 1 and carries out distribution of various types of data between the processors.

Figure 2:
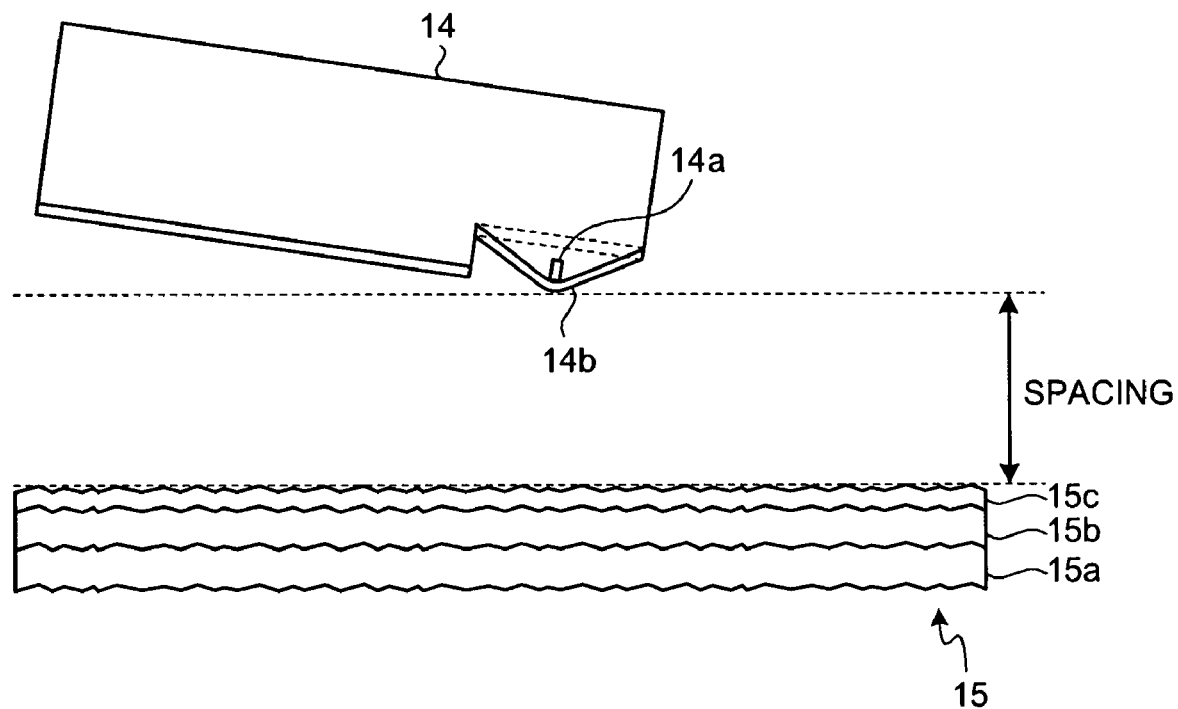
FIG. 2 is an enlarged schematic view of a head and a magnetic disk shown in FIG. 1.

FIG. 2 is an enlarged schematic view of the head 14 and the magnetic disk 15 according to the embodiment.

As shown in FIG. 2, the magnetic disk 15 includes a magnetic layer 15a overlapped on a foundation layer of a substrate consisting of a texture (asperities) processed glass or aluminum. A protecting layer 15b is laminated on a surface of the magnetic layer 15a and a lubricating layer 15c is further formed on the outer side of the protecting layer 15b. Data is recorded in the magnetic layer 15a and the head 14 reads the data signals from the magnetic layer 15a. Because the substrate is texture processed, boundaries of various layers are not completely smooth. Thus, the surface of the magnetic disk 15 includes minute asperities that are shown in FIG. 2.

The not shown heater is built inside the head 14. A tip 14b of the head 14 includes a read/write element 14a. Heating the heater by supplying power causes thermal expansion of the tip 14b in the direction of the magnetic disk 15. Thus, the spacing between the surface (in the example shown in FIG. 2, the surface of the minute asperities nearest the head 14 side is taken as standard) of the magnetic disk 15 and the tip 14b can be regulated.

Figure 3:
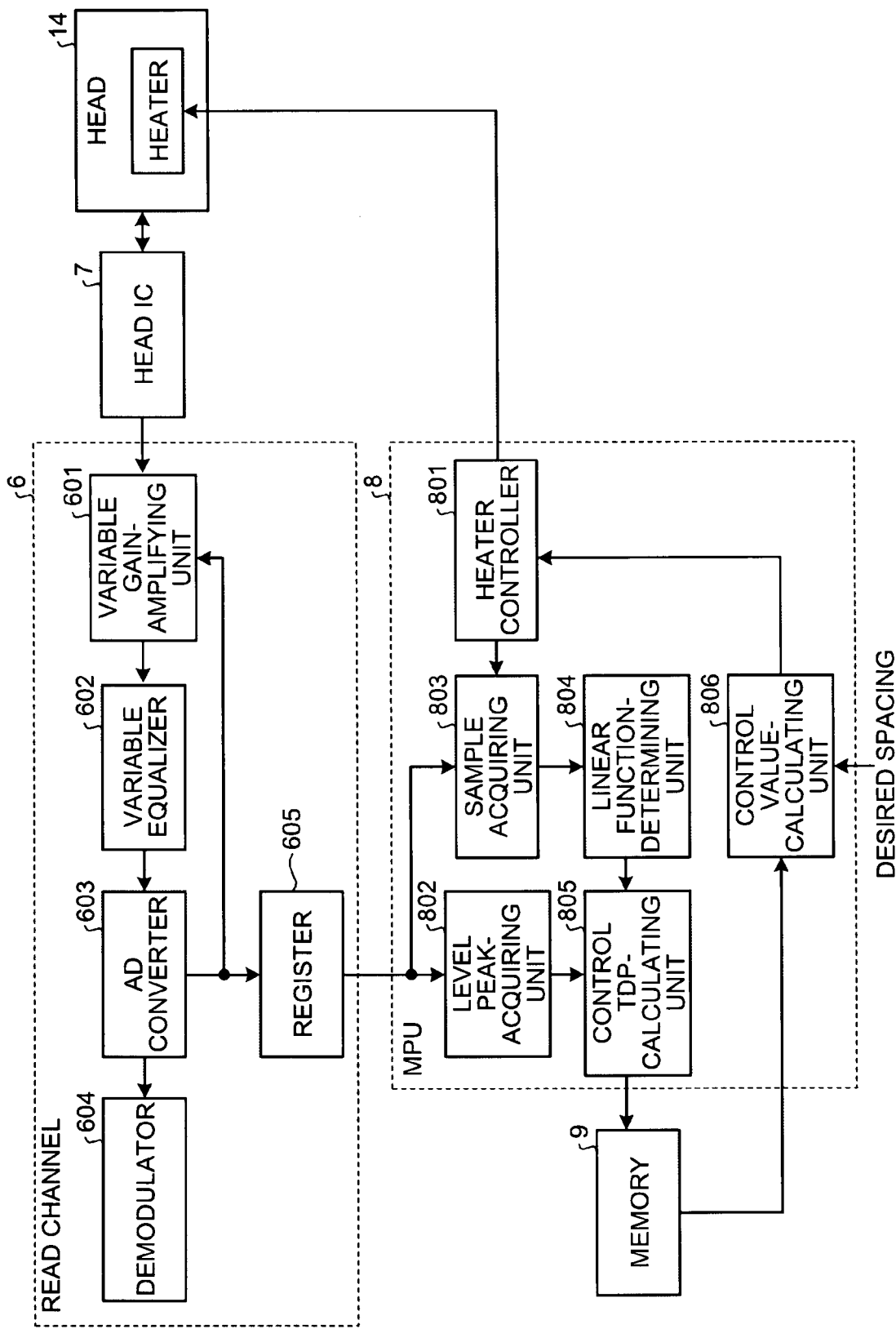
FIG. 3 is a block diagram of relevant components of the magnetic disk device shown in FIG. 1.

FIG. 3 is a block diagram of the read channel 6 and the MPU 8 of the magnetic disk device 1 according to the embodiment. As shown in FIG. 3, the read channel 6 includes a variable gain-amplifying unit 601, a variable equalizer 602, an AD converter 603, a demodulator 604, and a register 605.

The variable gain-amplifying unit 601 includes a variable gain amplifier that can modify a gain. According to gain signals that are fed back from the AD converter 603, the variable gain-amplifying unit 601 sets a gain of the variable gain amplifier to amplify the data signals that are output from the head IC 7. The variable gain-amplifying unit 601 sets the gain such that a level of the data signals after amplification becomes a constant value. In other words, the variable gain-amplifying unit 601, the variable equalizer 602 and the AD converter 603 form an Auto Gain Control (AGC) loop.

The variable equalizer 602 regulates frequency characteristics of the data signals after amplification by the variable gain-amplifying unit 601 and outputs obtained data signals to the AD converter 603.

The AD converter 603 carries out AD conversion of the data signals that are output from the variable equalizer 602 and outputs obtained digital data signals to the demodulator 604. Further, based on the level of the data signals that are output from the variable equalizer 602, the AD converter 603 generates gain signals for controlling the gain of the variable gain-amplifying unit 601, feedbacks the generated gain signals to the variable gain-amplifying unit 601 and also outputs the gain signals to the register 605.

The demodulator 604 demodulates the digital data signals after AD conversion and outputs demodulated signals after AD conversion to the format controller 5 that carries out error check of data and the like.

The register 605 temporarily stores therein the gain signals that are output from the AD converter 603 and supplies the gain signals to the MPU 8. The gain signals that are stored in the register 605 indicate the gain for amplifying to the constant value, the level of the data signals that are input into the variable gain-amplifying unit 601. The gain increases if the level of the signals read by the head 14 is low and the gain decreases if the level of the signals read by the head 14 is high. Thus, the signal level of the data signals read by the head 14 can be acquired from the gain signals that are stored by the register 605.

As shown in FIG. 3, the MPU 8 includes a heater controller 801, a level peak-acquiring unit 802, a sample acquiring unit 803, a linear function-determining unit 804, a control Touch Down Point-calculating unit (hereinafter, "control TDP-calculating unit") 805, and a control value-calculating unit 806.

The heater controller 801 controls a heater power of the heater that is built into the head 14. To be specific, when carrying out a calibration to acquire a correspondence between the heater power and the spacing, the heater controller 801 gradually increases the heater power from zero to a predetermined power in a predetermined control range. When increasing the heater power, the heater controller 801 minutely increases the heater power in a sampling range of the heater power that is appropriate for acquiring a sample of a correspondence between the heater power and the signal level, and notifies the sample acquiring unit 803 of the heater power when necessary. During a normal operation, the heater controller 801 treats as the heater power, a control value that is specified by the control value-calculating unit 806.

The level peak-acquiring unit 802 converts into the signal level, the gain signals that are supplied by the register 605 of the read channel 6. The level peak-acquiring unit 802 acquires a peak of the signal level during the calibration when the heater power is increased from zero to the predetermined power. Because the peak of the signal level that is acquired by the level peak-acquiring unit 802 is an upper limit of the signal level, the sensitivity to the signals is not enhanced beyond the upper limit. Thus, it can be assumed that the tip 14b of the head 14 is touching the surface of the magnetic disk 15 at the time when the signal level has at least reached the peak. In other words, it can be assumed that the tip 14b is nearest the surface of the magnetic disk 15 at the peak of the signal level.

In the sampling range of the heater power that is notified by the heater controller 801, the sample acquiring unit 803 converts to the signal level, the gain signals that are supplied by the register 605 of the read channel 6 and acquires a sample of a combination of the heater power and the signal level. In the sampling range that is used by the sample acquiring unit 803 to acquire the sample, the heater power is comparatively low and the distance (spacing) between the tip 14b of the head 14 and the surface of the magnetic disk 15 is comparatively large. In other words, in the sampling range, the tip 14b is not affected by the asperities on the surface of the magnetic disk 15 and a relation between the heater power and the signal level maintains a linearity. The sampling range is near the heater power when actually regulating the position of the tip 14b of the head 14 during an operation of the magnetic disk device 1.

Based on the sample of the combination of the heater power and the signal level that is acquired by the sample acquiring unit 803, the linear function-determining unit 804 determines a linear function that approximates the relation between the heater power and the signal level. In the sampling range that is used by the sample acquiring unit 803 to acquire the sample, because the heater power and the signal level maintain the linearity, the linear function-determining unit 804 can determine the linear function from the sample.

Based on the peak of the signal level acquired by the level peak-acquiring unit 802 and the linear function determined by the linear function-determining unit 804, the control TDP-calculating unit 805 calculates the heater power corresponding to the peak of the signal level and treats the calculated heater power as a control touchdown point. The control touchdown point indicates a touchdown point upon assuming that the linearity of the heater power and the signal level continues even if the heater power is increased and the spacing is reduced. In other words, although the linearity of the heater power and the signal level is actually disrupted when the heater power is increased and the spacing is reduced, the control touchdown point indicates the heater power corresponding to a zero spacing upon assuming that the linearity is not disrupted. Thus, a value of the control touchdown point is less than a physical touchdown point when an actual touchdown occurs.

Upon calculating the control touchdown point, using a Wallace relational expression, for example, it is possible to calculate the spacing when the heater power is zero, in other words, the spacing when the tip 14b of the head 14 has not thermally expanded towards the magnetic disk 15. Further, in the range that is controlled for regulating the position of the tip 14b during the operation of the magnetic disk device 1, because the spacing can be treated as zero when the heater power becomes equal to the control touchdown point, the linear function of the heater power and the signal level can be substituted by the linear function of the heater power and the spacing. Consequently, the control TDP-calculating unit 805 calculates a linear function of the heater power and the spacing and stores in the memory 9, the control touchdown point, the spacing when the heater power is zero, and the linear function of the heater power and the spacing.

When regulating the position of the tip 14b during the operation of the magnetic disk device 1, the control value-calculating unit 806 reads the linear function of the heater power and the spacing that is stored in the memory 9 and calculates the control value by calculating the heater power that corresponds to a desired spacing that is input from an external device. Further, the control value-calculating unit 806 outputs the calculated control value to the heater controller 801.

Figure 4:
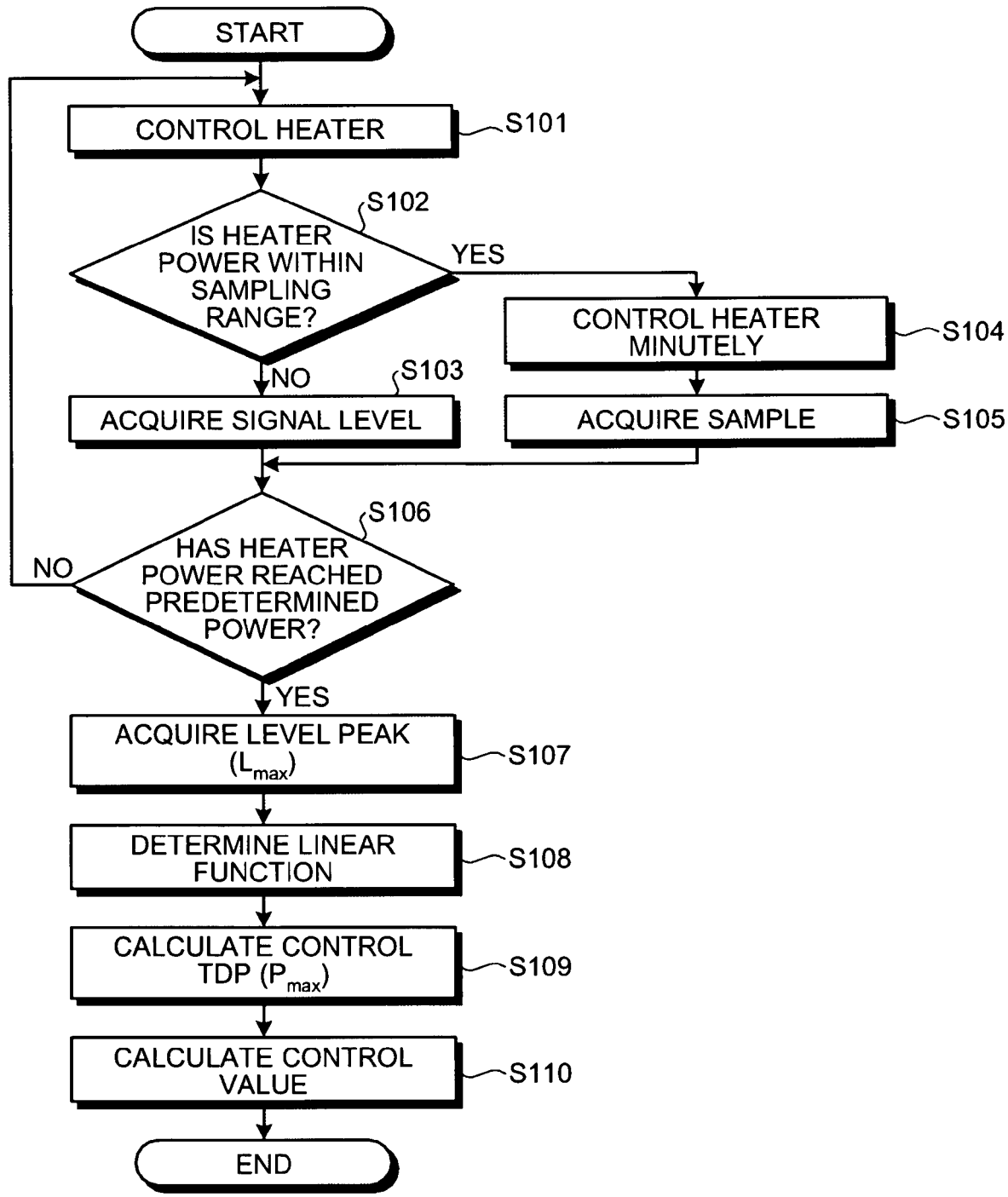
FIG. 4 is a flowchart of a calibrating operation according to the embodiment.

A calibrating operation performed by the magnetic disk device 1 that includes the structure mentioned earlier is explained next with reference to a flowchart shown in FIG. 4 using a specific example.

Upon starting the calibrating operation, first, the heater controller 801 controls the heater of the head 14 (step S101) and sets the heater power to an initial value. Further, the heater controller 801 determines whether the heater power is within the sampling range (step S102). If the heater power is not within the sampling range (No at step S102), the level peak-acquiring unit 802 acquires the level of the data signals that are read from the magnetic disk 15 by the tip 14b of the head 14 (step S103). In other words, after the heater power is controlled, the data signals read by the thermally expanded tip 14b are input into the read channel 6 via the head IC 7. The register 605 supplies to the level peak-acquiring unit 802, the gain signals in the AGC loop inside the read channel 6 and the level peak-acquiring unit 802 acquires the signal level from the gain signals. The level peak-acquiring unit 802 stores therein the signal level.

Figure 5A:
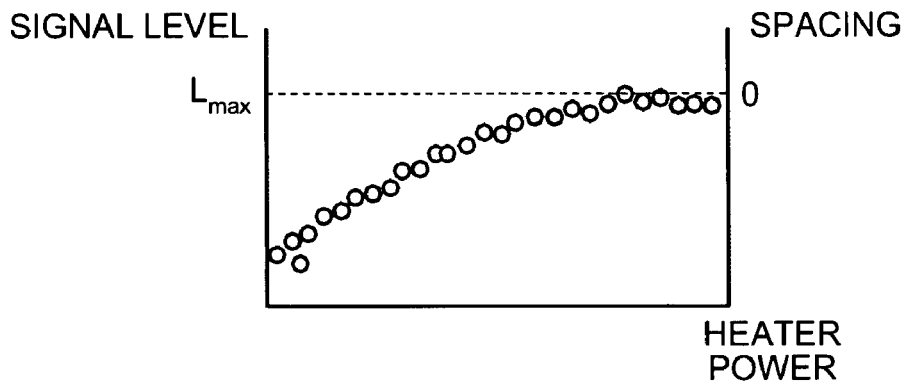
FIG. 5A is a graph of a sequence of calibration according to the embodiment.

Next, the heater controller 801 determines whether the heater power has reached the predetermined power (step S106). If the heater power has not reached the predetermined power (No at step S106), the heater controller 801 controls the heater again (step S101) and sets the heater power to a value that is larger than the currently set value by the predetermined control range. Next, during a period when the heater power is not within the sampling range, the heater controller 801 similarly increases the heater power by the predetermined control range and the level peak-acquiring unit 802 acquires the signal level. Finally, upon the heater power reaching the predetermined power (Yes at step S106), the level peak-acquiring unit 802 acquires a peak Lmax, shown in FIGS. 5A to 5C for example, of the stored signal level (step S107).

When the signal level has reached the peak Lmax, because it can be assumed that the tip 14b and the magnetic disk 15 cannot approach near each other further, the spacing corresponding to the peak Lmax can be treated as zero.

Upon the heater power coming within the sampling range when the heater controller 801 is increasing the heater power by the predetermined control range (Yes at step S102), the heater controller 801 further splits the predetermined control range minutely, increases the heater power by the split range (step S104), and notifies the sample acquiring unit 803 of every increase in the heater power. The sample acquiring unit 803 acquires the signal level corresponding to the heater power notified from the heater controller 801 (step S105) and stores the acquired signal level as the sample of the combination of the heater power and the signal level. In other words, every time the heater power is controlled, the data signals that are read by the thermally expanded tip 14b are input into the read channel 6 via the head IC 7, the gain signals in the AGC loop inside the read channel 6 are supplied from the register 605 to the sample acquiring unit 803, the sample acquiring unit 803 acquires the signal level from the gain signals, and stores therein the combination of the heater power and the signal level.

In the calibrating operation explained earlier, the heater power is further minutely controlled within the sampling range to acquire more signal levels compared to when the heater power is outside the sampling range. However, regardless of whether the heater power is within or outside the sampling range, the signal level can be acquired by increasing the heater power by a fixed control range, and the correspondence between the heater power and the signal level can be established and maintained only within the sampling range. Further, when carrying out a minute control of the heater within the sampling range, heater control for acquiring the peak Lmax of the signal level and heater control for acquiring the sample within the sampling range can also be carried out separately.

Figure 5B:
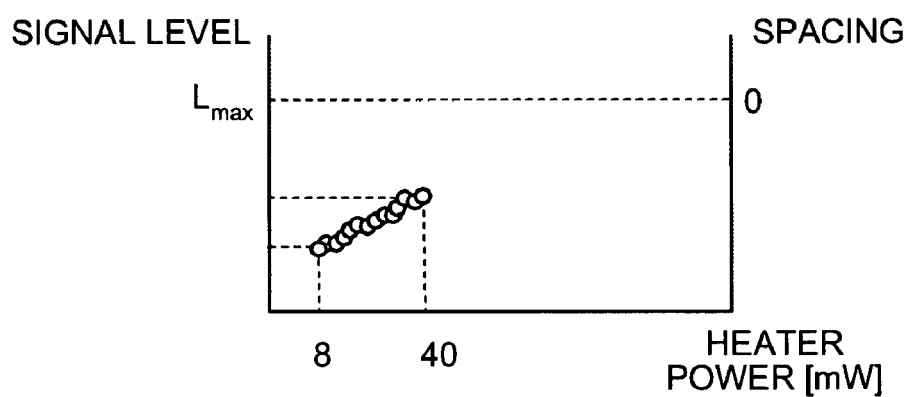
FIG. 5B is a graph of a sequence of the calibration according to the embodiment.

The sampling range is a range of the heater power that is actually controlled during the operation of the magnetic disk device 1 and the heater power within the sampling range is comparatively low. A heater power of 0 to 60 milliwatts (mW) is desirable in the sampling range. Further, because an output of the signal level is unstable when the heater power is nearly 0 mW, as shown in FIG. 5B, a heater power of 8 to 40 mW is desirable.

Upon the sample acquiring unit 803 acquiring the sample and the level peak-acquiring unit 802 acquiring the peak Lmax of the signal level (step S107), by using the sample that is stored by the sample acquiring unit 803, the linear function-determining unit 804 determines the linear function that approximates the relation between the heater power and the signal level in the sample (step S108). To be specific, for example, by plotting the signal level corresponding to the heater power in a two-dimensional coordinate system and applying a least squares method, a linear approximation curve of the sample can be determined. The linear function-determining unit 804 notifies the control TDP-calculating unit 805 of the determined linear function (in other words, the linear approximation curve).

Using the linear function, the control TDP-calculating unit 805 calculates as the control touchdown point, a heater power Pmax corresponding to the peak Lmax of the signal level (step S109). In other words, upon assuming that the linearity of the relation between the heater power in the range that is actually controlled during the operation of the magnetic disk device 1 and the signal level is maintained regardless of the increase in the heater power, the control TDP-calculating unit 805 calculates as the touchdown point, the heater power Pmax at the time when a touchdown is assumed to occur. However, because the linearity of the relation between the heater power and the signal level is disrupted upon actually increasing the heater power, the tip 14b does not touch the surface of the magnetic disk 15 at the control touchdown point Pmax and a physical touchdown does not occur.

Figure 5C:
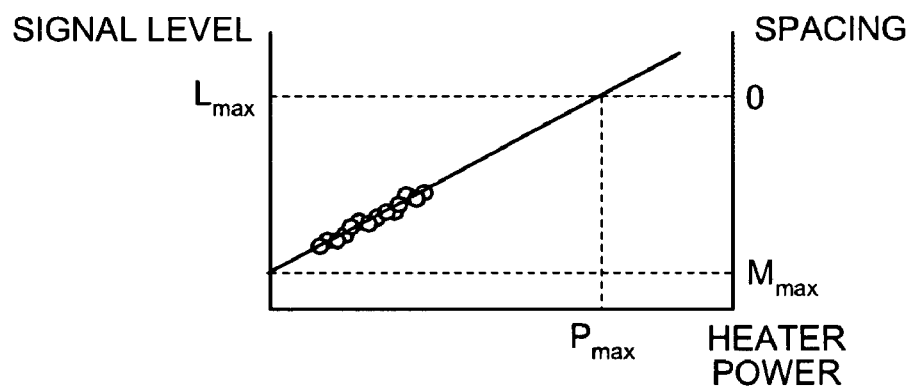
FIG. 5C is a graph of a sequence of the calibration according to the embodiment.

Upon calculating the control touchdown point Pmax, the control TDP-calculating unit 805 uses the Wallace relational expression, for example, to convert the relation between the heater power and the signal level into the relation between the heater power and the spacing. Thus, as shown in FIG. 5C for example, the control TDP-calculating unit 805 uses the Wallace relational expression to calculate a spacing Mmax when the heater power is zero. Because the spacing is zero when the signal level is the peak Lmax, the control TDP-calculating unit 805 converts into the linear function of the heater power and the spacing, the linear function that is determined by the linear function-determining unit 804. The control TDP-calculating unit 805 stores in the memory 9, the linear function that is obtained by conversion.

Figure 6:
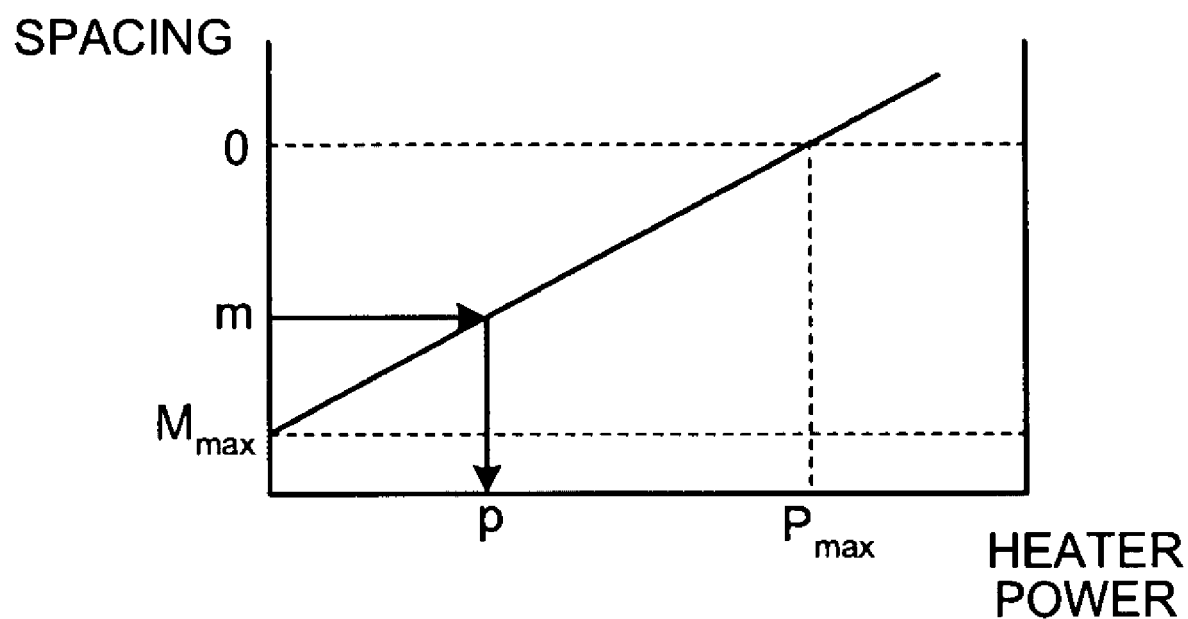
FIG. 6 is a graph of an example of a control value calculation according to the embodiment.
Figure 7A:
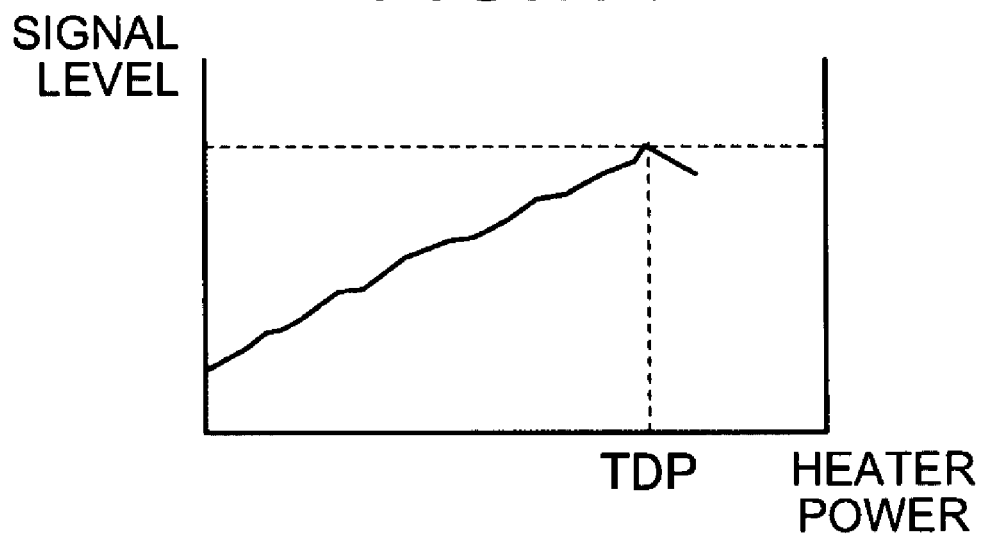
FIG. 7A is a graph of an example of characteristics of the head.
Figure 7B:
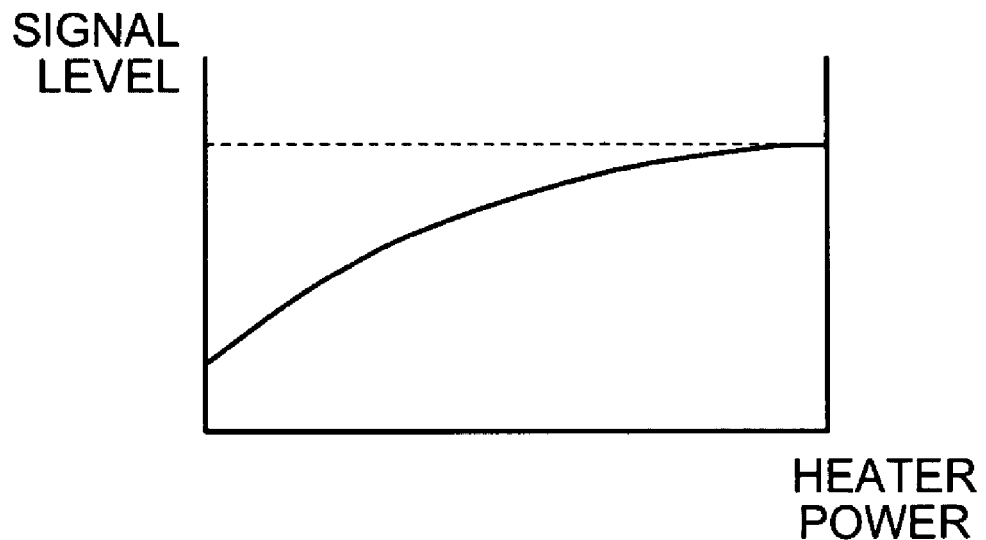
FIG. 7B is a graph of an example of characteristics of the head.

Thus, the correspondence between the heater power and the spacing is acquired and the calibrating operation is completed. When regulating the spacing by controlling the heater power, the control value-calculating unit 806 calculates as the control value, the heater power corresponding to the desired spacing (step S110). In other words, the control value-calculating unit 806 reads the linear function from the memory 9. Next, as shown in FIG. 6, for example, the control value-calculating unit 806 substitutes in the linear expression a desired spacing m that is input from the external device, and calculates a control value p of the heater power corresponding to the spacing m.

The control value-calculating unit 806 notifies the heater controller 801 of the control value p. The heater controller 801 controls the heater that is built into the head 14. The heater is heated according to the control by the heater controller 801 and the position of the tip 14b is regulated due to thermal expansion. Because the control value p is generally within or near the sampling range that is used by the sample acquiring unit 803 to fetch the sample of the signal level, the relation between the heater power and the spacing is within the range that can be approximated by the linear function and the distance between the tip 14b and the surface of the magnetic disk 15 is equal to the desired spacing m.

According to the embodiment, the signal level, which corresponds to the control range of the heater power when actually operating the magnetic disk device, is treated as the sample to determine the linear function that approximates the relation between the heater power and the signal level. The control touchdown point is calculated from the determined linear function and the control touchdown point is used to calculate the linear function of the relation between the heater power and the spacing. Due to this, using the acquired linear function enables to accurately calculate the heater power corresponding to the desired spacing and setting the heater power as the calculated control value enables to accurately control the spacing between the head and the disk medium.

Further, in the embodiment, the relation of the heater power and the signal level and the relation of the heater power and the spacing are approximated using the linear functions. However, the relation of the heater power and the signal level and the relation of the heater power and the spacing can also be approximated by quadratic functions or functions of higher order. However, even when using the quadratic functions or the functions of higher order, the sample of the correspondence between the heater power and the signal level is acquired near the control range of the heater power when actually operating the magnetic disk device.

In the embodiment, the signal level corresponding to the heater power is acquired as the sample. However, because the gain which amplifies the level of the data signals to the constant value is set in the variable gain-amplifying unit 601, the gain in the variable gain-amplifying unit 601 is an indicator of the signal level and the gain set in the variable gain-amplifying unit 601 can be acquired directly as the sample instead of the signal level that is converted from the gain signals. Further, the relation between the heater power and the spacing is calculated in the embodiment. However, a relation between the heater power and a magnetic spacing between the tip 14b and the magnetic layer 15a of the magnetic disk 15 can also be calculated instead of the spacing. The magnetic spacing does not become zero even at the touchdown point and takes the minimum value.

The calibration according to the embodiment can also be carried out by causing the MPU 8 to execute a computer program that is installed from outside the magnetic disk device 1. Apart from the MPU 8, a Central Processing Unit (CPU) or a Micro Controller Unit (MCU) can also be used to execute the computer program in the magnetic disk device 1.

According to a structure explained in an embodiment of the present invention, a sample of a signal level is acquired in a range such that a tip and a storage medium do not interfere with each other. Due to this, an accurate correspondence between a spacing and a heater power can be obtained and the heater power corresponding to a desired spacing can be calculated. Thus, the spacing between a head and the storage medium can be accurately controlled.

According to the structure, a control touchdown point is obtained upon assuming that the tip and the storage medium do not interfere with each other even after approaching near each other, thus enabling to further accurately calculate a function of a relation between the heater power and the spacing.

According to the structure, the spacing when the tip has not approached a surface of the storage medium can be calculated more accurately.

According to the structure, increasing the heater power enables to reliably acquire a peak of the signal level when a sensitivity of the tip to the signals becomes maximum upon the tip touching the storage medium.

According to the structure, one time heater control enables to acquire the peak of the signal level and the sample for determining an approximation function.

According to the structure, more samples of the heater power and the signal level can be acquired and the approximation function can be determined more accurately.

According to the structure, the approximation function, which is appropriate for actually regulating the position of the tip, is determined. Thus, the spacing can be controlled more accurately.

According to the structure, the tip does not undergo excessive thermal expansion during acquisition of the sample, thus enabling to prevent plastic deformation in which a shape of the tip fails to return to the original shape.

According to the structure, the relation between the heater power and the spacing is also approximated using a linear function. Thus, a control value of the heater power corresponding to the desired spacing can be easily calculated.

According to the structure, converting a gain into the signal level is not necessary and a process for calculating the signal level can be omitted.

According to the structure, controlling the heater power such that the heater power becomes equal to the control value enables to regulate the spacing to the desired distance.

According to an embodiment of the present invention, the spacing between the head and a disk medium can be accurately controlled.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A head controller that controls using thermal expansion due to a heater, a position of a tip of a head that faces a storage medium and that at least reads signals from the storage medium, the head controller comprising:
    a heater controller that increases a heater power of the heater till reaching a first threshold;
    an acquiring unit that acquires a sample of a combination of the heater power and a signal level of signals that are read from the storage medium during an increase in the heater power till a second threshold smaller than the first threshold is reached;
    a determining unit that determines an approximation function that approximates a relation of the sample acquired by the acquiring unit;

a peak acquiring unit that acquires a peak of the signal level during an increase in the heater power till reaching the first threshold; and a calculating unit that calculates an upper limit of the heater power based on the approximation function determined by the determining unit and the peak acquired by the peak acquiring unit.

2. The head controller according to claim 1, wherein
the calculating unit calculates a heater power corresponding to the peak by using the approximation function, and determines the heater power calculated as the upper limit of the heater power.

3. The head controller according to claim 1, further comprising a converter that converts the approximation function determined by the determining unit into a function of the heater power and a distance between the tip of the head and the surface of the storage medium, and wherein
the converter calculates the distance between the tip of the head and the surface of the storage medium corresponding to zero in heater power of the heater, from the upper limit of the heater power calculated by the calculating unit.

4. The head controller according to claim 3 further comprising:
a control value-calculating unit that calculates a control value of the heater power corresponding to a desired distance between the tip of the head and the surface of the storage medium by using a function obtained due to conversion by the converter.

5. The head controller according to claim 1, wherein
the heater controller increases the heater power of the heater by a predetermined control range.

6. The head controller according to claim 5, wherein the heater controller splits the control range of the heater power more minutely during the increase in the heater power till the second threshold than during the increase in the heater power from the second threshold till the first threshold.

7. The head controller according to claim 1, wherein the acquiring unit acquires the sample in a range of the heater power that is actually controlled for regulating the position of the tip of the head.

8. The head controller according to claim 7, wherein the acquiring unit acquires the sample in the range of the heater power less than or equal to 60 milliwatts (mW).

9. The head controller according to claim 1, wherein the determining unit approximates the relation of the heater power and the signal level by using a linear function.

10. The head controller according to claim 1, wherein the acquiring unit acquires the sample of a combination of the heater power and a gain that amplifies the signal level to a constant value.

11. A storage device that stores data in a storage medium, the storage device comprising:
a read/write unit that faces the storage medium and that reads signals from the storage medium and writes signals to the storage medium;
a heater that controls a position of the read/write unit by using thermal expansion due to the heater;
a heater controller that increases a heater power of the heater till reaching a first threshold;
an acquiring unit that acquires a sample of the heater power and a signal level of the signals that are read from the storage medium by the read/write unit during an increase in the heater power till a second threshold smaller than the first threshold is reached;
a determining unit that determines an approximation function that approximates a relation of the sample acquired by the acquiring unit;
a peak acquiring unit that acquires a peak of the signal level during an increase in the heater power till reaching the first threshold; and
a calculation unit that calculates an upper limit of the heater power based on the approximation function determined by the determining unit and the peak acquired by the peak acquiring unit.

12. A head controlling method that controls using thermal expansion due to a heater, a position of a tip of a head that faces a storage medium and that at least reads signals from the storage medium, the head controlling method comprising:
increasing a heater power of the heater till reaching a first threshold;
acquiring a sample of a combination of the heater power and a signal level of signals that are read from the storage medium during an increase in the heater power till a second threshold smaller than the first threshold is reached;
determining an approximation function that approximates a relation of the sample acquired by the acquiring;
acquiring a peak of the signal level during an increase in the heater power till reaching the first threshold;
calculating an upper limit of the heater power based on the approximation function determined and the peak acquired.

* * * * *